Jan. 27, 1948.  S. A. McCLELLAN  2,435,090
ERECTOR SYSTEM FOR GYROSCOPES
Filed Aug. 9, 1944

INVENTOR.
STEPHEN A. McCLELLAN
BY
ATTORNEYS

Patented Jan. 27, 1948

2,435,090

UNITED STATES PATENT OFFICE 2,435,090

ERECTOR SYSTEM FOR GYROSCOPES

Stephen A. McClellan, Glen Cove, N. Y., assignor to Specialties, Inc., Locust Valley, N. Y., a corporation of New York Application August 9, 1944, Serial No. 548,750

2 Claims. (Cl. 74—5)

This invention has for an object to provide an improved erector system for vertical axis gyroscopes. The invention aims to provide an improved erector system adapted to be rendered temporarily inoperative upon occasion. Another object is to provide a gravity operating erector system having means whereby the centre of gravity of the erector weight can be held temporarily substantially at the gyroscope axis to render the erector system inoperative.

The invention has been developed in connection with the production of a gyroscope having a ball type erecting system and for the purposes of disclosure such an embodiment of the invention will be more particularly described.

Ball type erecting systems for restoring to desired vertical position the axis of a vertical spin axis gyroscope having three degrees of freedom, as used in aircraft, are generally old, examples of such systems being illustrated in United States Patent No. 1,311,768, issued July 29, 1919, to J. and J. G. Gray.

When an aircraft is executing a turn or when it is subject to the violent shocks of its own gun fire or of nearby shell bursts which often occur in rapid succession the resulting disturbance of the gyroscope may be aggravated rather than corrected by the erecting system. Accordingly it is desirable to provide for rendering the erecting system inoperative either automatically or by action of an operator at will.

The present invention provides, in the embodiment illustrated, an arrangement under control of an electric circuit, wherein the balls which constitute the gravity responsive erector means of the system may be temporarily so held that the center of gravity is coincident with the gyroscope axis. More particularly the erecting system of the embodiment shown comprises a stationary track concentric with the spin axis of the gyroscope and lying in a plane normal thereto, around which three balls are advanced by means driven at a predetermined fraction of the rate of revolution of the gyroscope rotor, each ball being confined to a sector having a length of about 60°. The three sectors are equidistantly spaced.

When it is desired to render the erector system inoperative the three balls are locked in equally spaced relation whereby the centre of gravity is substantially at the gyroscope axis and the weights are therefore inoperative to cause precession.

Figure 1:
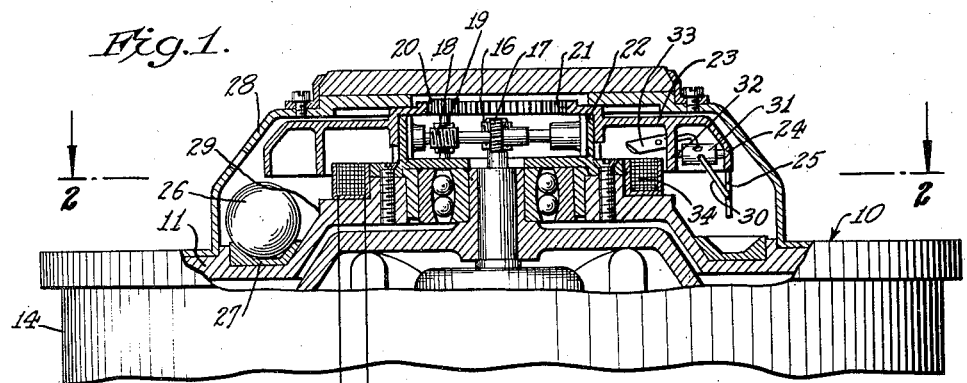
Figure 2:
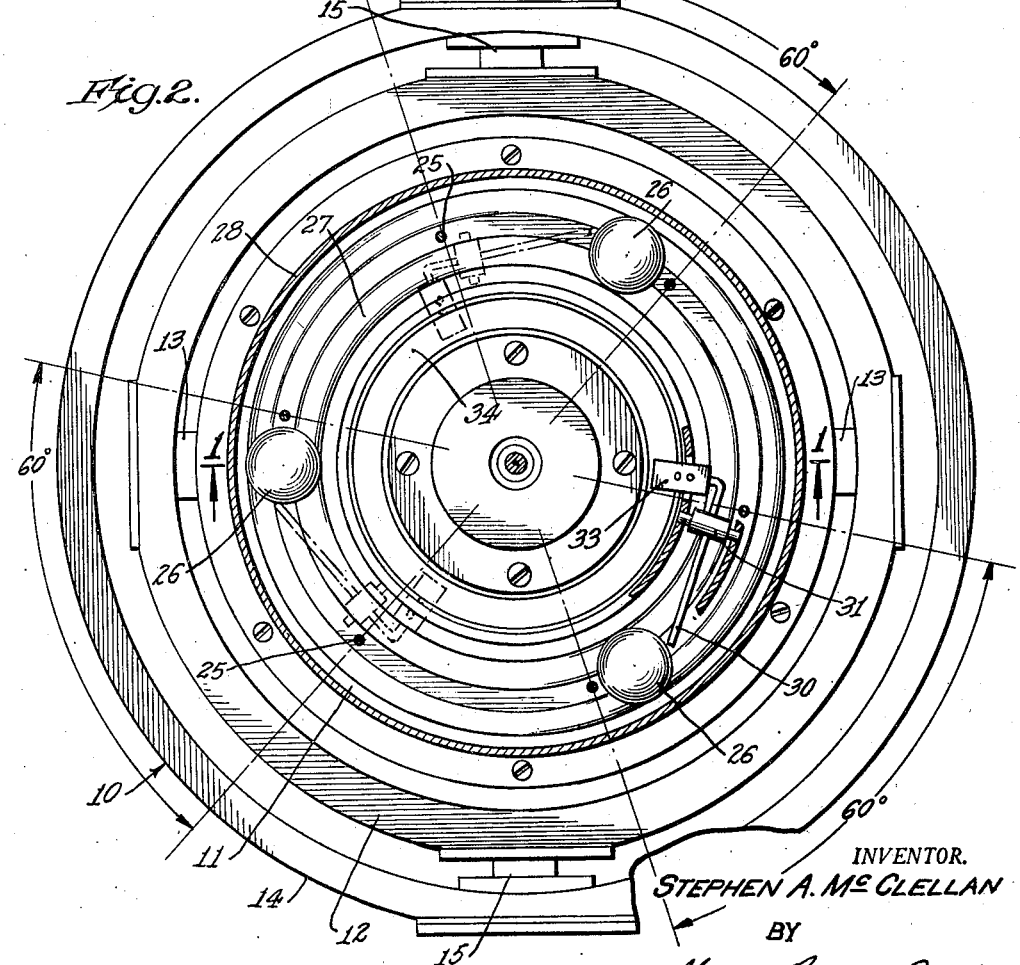

For a more complete understanding of the invention, reference may be had to the accompanying drawings, in which:

Figure 1 is an elevation of a vertical gyroscope equipped with the ball erecting system of this invention, shown partly in section as seen along the line 1—1 of Fig. 2; and Fig. 2 is a plan view of the gyroscope shown partly in section as seen along the line 2—2 of Fig. 1, and illustrating the ball erecting system in enlarged detail.

Referring to Fig. 1 of the drawing, numeral 10 designates a gyroscope, preferably electrically driven, although it may be air-spun, arranged for rotation about a normally vertical axis, and mounted in a Cardan suspension for angular movement about two mutually perpendicular horizontal axes normally lying in a plane at right angles to the spin axis, so that the gyroscope has three degrees of freedom. The gyroscope rotor is mounted within the casing 11 and the aforementioned Cardan suspension comprises inner gimbal ring 12 on which the casing 11 pivots about axes 13, and an outer gimbal ring 14 shown in Fig. 2, on which inner gimbal ring 12 pivots about axes 15 arranged in a vertical plane at right angles to the plane of axes 13. Outer gimbal ring 14 is suitably supported on the airplane or other base, and preferably comprises the housing for the instrument, or at least the lower half thereof.

As shown in Fig. 1, the spin axis of the gyroscope is preferably extended through the top of the casing 11 and carries the worm 16, which meshes with a worm wheel 17 carrying the worm 18 meshing with a worm wheel 19, fixed on a vertically arranged shaft carrying at its upper end the spur pinion 20 which engages and thus drives an internal spur ring gear 21. The gearing just described constitutes a reduction gearing, whereby the internal ring gear 21 is driven at a rate materially less than the high spin rate of the gyroscope rotor, and numerous tests have indicated that for the purpose desired, the rate of revolution of internal ring gear 21 should be a definite function of the kinetic momentum of the gyroscope.

Ring gear 21 is journalled on a tubular axial extension 22 of the casing 11 and carries a disc-like head 23 rotating therewith and having a concentric depending flange 24 from which project the spaced vertical pins 25. As shown in Fig. 2, six equally-spaced depending pins 25 are employed, so that the spacing between them is 60°. Positioned between alternate pairs of pins 25 are the three balls 26, which roll on track 27 fixed to the top of the gyroscope casing 11. The track 27 is generally V-shaped in cross-section, as shown in Fig. 1, and its center lies immediately below the pins 25, so that the angular freedom of each ball 25 is restricted to that portion of track 27 which lies between the corresponding pins 25, and the radial freedom of the balls is restricted by the track 27 to its own radius. A hood 28 enclosing the balls 26 co-operating with the upwardly extending center portion 29 on the casing, as well as the depending flange 24 of the head 23 prevent the balls 26 from being dislodged from the track, even during the most violent disturbance of the instrument.

In operation of the ball erecting system of this invention, each of the three balls 26 is constantly driven in a predetermined direction around track 27 by the corresponding pin 25 in engagement therewith. The rate at which the ball 26 is driven is relatively low compared to the rate of revolution of the gyroscope rotor as aforementioned, and is such that the period of rest of a ball 26 at the lowest point of its path during a tilt of the gyroscope is brought to the required limits. For example, a rate of ball-driving movement of approximately thirteen revolutions per minute has been found to be most effective in some installations, although the rate may be more or less, depending upon the total kinetic momentum of the gyroscope.

When the gyroscope is level, the three balls are simply pushed around the track 27 at the indicated rate and, as the corresponding pairs of pins 25 are equally spaced, the balls are in static balance around the center of the system. If the gyroscope tilts in response to some external disturbance the balls tend to roll toward the low point of the track. If a ball is being moved downhill at the time, it rolls away from the corresponding pin 25 which had been driving it. However, the limit of movement of the ball is substantially 60°, so that under no conditions is more than one ball free to roll to the lowest point of the track, although the other balls tend to roll to that point but may not roll that far because precluded from doing so by the limiting pins 25.

Accordingly, although the balls introduce the erecting couple causing the gyroscope to precess back to true vertical axis position, aggravation of the tilt by unbalance created when the balls 26 respond to a lateral acceleration is minimized and usually eliminated, and hence the total time from initial tilt back to vertical is low. Neither are the balls 26 free to move radially and thus the tendency to aggravation of the tilt is further reduced. As aforementioned, this property of the erecting system of this invention is especially valuable in cases where the instrument is likely to be roughly handled, as on an airplane subjected to the violent recoil shocks of its own gunfire or those resulting from nearby shell bursts, and the like. In addition to these advantages, the erecting system is extremely simple in construction and reliable in operation under all conditions of use.

During some conditions of flight it is desirable to lock the balls 26 against movement and preferably to lock them in equally spaced relation, that is, in a neutral relation. For example, if the instrument is mounted on an airplane, it is desirable to lock the balls 26 against movement relatively to the rotating head 23 while the airplane is executing a turn, in order to preclude undue disturbance of the gyroscope by the balls 26 under that special condition. To that end, lock-out gates cooperating with the balls 26 driving pins 25 are provided, and comprise one arm 30 for each ball pivoted at 31 between flanges 24 and 32 of rotating head 23 and carrying an armature 33 positioned above and in the field of a stationary coil 34 mounted on the gyroscope casing 11. Coil 34 is normally energized so that each armature 33 holds corresponding arm 30 out of the path of the corresponding ball 26. However, during a turn the coil 34 is deenergized by opening switch 35, either manually or automatically, as by a turn indicator, and each arm 30, being gravity-biased, drops into the path of the corresponding ball 26 and traps it between the driving pin 25 and arm 30. When the turn has been completed, coil 34 is reenergized and armatures 33 restore the lock-out arms 30 to inactive position out of the path of balls 26. Further details of construction and operation of such lock-out mechanisms may be obtained by reference to copending application Serial No. 526,075, filed March 11, 1944, by Robert Alkan.

Although a preferred embodiment of the invention has been illustrated and described herein, the invention is not limited thereby except as defined by the appended claims.

I claim:

1. In an erector system for a vertical axis gyroscope having a casing, the combination of a relatively stationary circular track on said casing concentric with said gyroscope axis, three balls on said track, a head on said casing having a depending flange extending over said balls to confine them against vertical movement, a plurality of pins depending from said flange into the path of said balls and spaced 60° apart, said balls being positioned between alternate pairs of said pins for angular freedom on said track of approximately 60°, and mechanism for driving said head about the axis of said gyroscope at a relatively slow rate to thereby drive said balls around said track at that rate, together with locking means for holding said balls in equally spaced relation comprising three pivoted arms gravity-biased to move into the path of the balls under the influence of gravity, said arms being arranged automatically to move aside to permit passage of the balls in the one direction and means for retracting said arms to leave the balls free.

2. In an erector system for a vertical axis gyroscope having a casing, the combination of a relatively stationary circular track on said casing concentric with said gyroscope axis, three balls on said track, means confining said balls against radial movement, a head on said casing having a depending flange extending over said balls to confine them against vertical movement, a plurality of pins depending from said flange into the path of said balls and spaced 60° apart, said balls being positioned between alternate pairs of said pins for angular freedom on said track of approximately 60° therewith, pivoted arms gravity-biased to move into the path of the balls under the influence of gravity, each arm adapted to confine one ball between a pin and the arm whereby the balls may be held in equally spaced relation, said arms being adapted automatically to move aside to permit passage of the ball toward the pin, and an electro-magnet arranged to be energized to move the pivoted arms out of the path of movement of the balls, and mechanism for driving said head about the axis of said gyroscope at a relatively slow rate to thereby drive said balls around said track at that rate.

STEPHEN A. McCLELLAN.

REFERENCES CITED

The following references are of record in the file of this patent:

UNITED STATES PATENTS

| Number | Name | Date |
|---|---|---|
| 1,311,768 | Gray | July 29, 1919 |

FOREIGN PATENTS

| Number | Country | Date |
|---|---|---|
| 161,595 | Great Britain | Apr. 21, 1921 |
| 221,006 | Great Britain | Sept. 1, 1924 |